United States Patent
Krygowski et al.

[19]

[11] Patent Number: 6,049,860

[45] Date of Patent: Apr. 11, 2000

[54] PIPELINED FLOATING POINT STORES

[75] Inventors: Christopher A. Krygowski, Hopewell Junction; Eric Mark Schwarz, Gardiner, both of N.Y.

[73] Assignee: International Business Machines Corporation, Armonk, N.Y.

[21] Appl. No.: 09/025,939

[22] Filed: Feb. 19, 1998

[51] Int. Cl.[7] .................................................. G06F 9/30
[52] U.S. Cl. ............................................................ 712/25
[58] Field of Search ............................... 712/23, 25, 201, 712/214, 222

[56] References Cited

U.S. PATENT DOCUMENTS

| | | | |
|---|---|---|---|
| 5,051,940 | 9/1991 | Vassilliadis et al. | 364/736 |
| 5,361,345 | 11/1994 | English | 395/375 |
| 5,471,593 | 11/1995 | Branigin | 395/375 |

OTHER PUBLICATIONS

"Parallel Structure For High Performance Floating Point Processor" IBM Technical Disclosure Bulletin, J. R. Rodriguez, vol. 30, No. 9, Feb. 1988, pp. 411–413.

*Primary Examiner*—David Y. Eng
*Attorney, Agent, or Firm*—Lynn L. Augspurger

[57] ABSTRACT

A floating point unit has a control unit, a data input register and a write stage register from which an instruction is transferred from the floating point unit to a storage unit. The floating point unit typically has multiple pipeline stages for arithmetic computation, a normalization stage, and a rounding stage, each of which pipeline stages may during processing of a stream of instructions contain a separate instruction. The stages are connected in an ordered manner such that the processing of instructions occurs in the pipeline. An active instruction is a "stalled" instruction within a pipeline when forward progress is not permitted to advance to a new stage in the pipeline because data needed is not available for a prior instruction creating a data dependency. A data dependent floating point store instruction is allowed, nevertheless, to progress in the pipeline even though its data is dependent on a previous instruction whose execution has not yet completed by providing intermediate result data from a previous instruction, and providing a forwarding path for the said data dependent floating point store instruction to skip stages in the floating point pipeline.

3 Claims, 4 Drawing Sheets

PIPELINED FLOATING POINT STORES

FIELD OF THE INVENTION

This invention relates to computer systems that execute floating point instructions, and particularly to a method and system for processing floating point store instructions in a floating point pipeline to improve data dependency resolution.

BACKGROUND OF THE INVENTION

Most modern micro-processors implement floating point instructions in hardware. Since a floating point instruction often requires multiple cycles of execution, a pipeline structure is implemented to allow over-lapped execution of these instructions. The pipeline implementation allows instructions to be accepted every cycle and to produce a result every cycle. Any blockages in the pipeline create stalls which in turn decrease the throughput of the pipeline and lower the performance of the micro-processor.

During the floating point computation it is often necessary to store away intermediate results. This is done through the use of a floating point store instruction which stores a specified floating point register to a specified storage address. In a micro-architecture which has in-order single instruction issue and completion it is desirable to execute the store instruction in the pipeline along with the other floating point instructions t o simplify control and minimize area.

Pipelining floating point store instructions presents a problem. A floating point store instruction may only require one cycle of execution. Executing floating point stores in the same pipeline with other floating point arithmetic instructions increases the latency of the store. The throughput of a pipeline is threatened by the occurrence of stall cycles. Therefore, it is desirable to minimize the occurrence of stall cycles. One source of stall cycles is when an instruction is data dependent on a previous instruction in the pipeline. Traditionally, the instruction is stalled at the top of the pipeline until the data can be effectively wrapped from the bottom of the pipeline into the input register. However, stalling the instruction at the top of the pipeline blocks other instructions from entering the pipeline. This is a problem addressed by our invention.

Floating point store instructions have typically been executed in dedicated load/store execution units. There are many disadvantages associated with using a separate load/store unit There is an additional area cost of the additional unit. The control sequencing of dispatching and completing from the addition unit is more complex. Additional read ports to the floating point register array are required thereby increasing its size. In order to eliminate stall cycles using a separate load/store unit, data forwarding paths are required that forward between the floating point execution unit to the load/store unit. These paths may be long and potentially limit the cycle time of the processor. In addition, the forwarding paths potentially contribute to a less than optimal wiring solution for the chip.

SUMMARY OF THE INVENTION

In our preferred embodiment we provide a floating point unit which has a control unit, a data input register and a write stage register from which an instruction is transferred from the floating point unit to a storage unit. The floating point unit typically has multiple pipeline stages for arithmetic computation, a normalization stage, and a rounding stage, each of which pipeline stages may during processing of a stream of instructions contain a separate instruction. The stages are connected in an ordered manner such that the processing of instructions occurs in the pipeline. An active instruction is a "stalled" instruction within a pipeline when forward progress is not permitted to advance to a new stage in the pipeline because data needed is not available for a prior instruction creating a data dependency. A data dependent floating point store instruction is allowed, nevertheless, to progress in the pipeline even though its data is dependent on a previous instruction whose execution has not yet completed by providing intermediate result data from a previous instruction, and providing a forwarding path for the said data dependent floating point store instruction to skip stages in the floating point pipeline.

Our solution removes the stall cycles for data dependent store instructions that are introduced into the pipeline. The store instruction is allowed to progress in the pipeline even though its data is dependent on a previous instruction whose execution has not yet completed.

The improvements which we have made remove the possible performance disadvantages of pipelining store instructions by removing possible stall cycles due to data dependencies. Our solution eliminates the need for a separate load/store unit and the area and complexity associated with it. It also simplifies the controls for dispatching instructions. It allows re-use of existing hardware for the detection of interlocks between instructions, the read ports for the floating point register file, the basic dataflow of the floating point pipeline, and the data forwarding paths within the pipeline.

These improvements are accomplished by providing a wrap path to resolve data dependent stores at the end of the pipeline. The late wrap path is controlled by a fast interlock resolution circuit. The cost of these improvements is minimal. A 64-bit byte rotator data alignment circuit is provided in the pipeline for store instructions just before the pipeline output register to align the data to be stored. This 64-bit byte rotator function is similar to an 8-way multiplexor circuit. Fast interlock resolution detection occurs as the store instruction enters the pipeline. The interlock detection for non-store instructions has been re-used for store instructions so there is no additional hardware cost associated with this circuitry. This interlock detection information is used to wrap results from a previous instruction in the last stage of the pipeline back through rotator and back into the result register. The additional cost of this is a two way multiplexor.

These and other improvements are set forth in the following detailed description. For a better understanding of the invention with advantages and features, refer to the description and to the drawings.

Our detailed description explains the preferred embodiments of our invention, together with advantages and features, by way of example with reference to the following drawings.

DETAILED DESCRIPTION OF THE INVENTION

A floating point unit typically consists of several pipeline stages such as multiple pipeline stages for arithmetic computation (addition or multiplication) a normalization stage, and a rounding stage. Each pipeline stage may contain a separate instruction and the stages are connected in an ordered manner. As an instruction enters the pipeline, the necessary input data operands are accessed and put into the first stage of the pipeline. The instruction advances from stage to stage within the pipeline as permitted. An instruction is considered to "stall" within a pipeline when forward progress is not allowed. An instruction is not permitted to advance to a new stage in the pipeline when the successive pipeline stage contains another previous instruction that itself cannot advance. An instruction cannot commence execution until it has data to operate on. It may not have data to operate upon when a earlier instruction will update the data that a successive instruction will operate upon. This is referred to as a data dependency. For this reason, the successive instruction will "stall" at the entrance to the pipeline until it receives the updated data.

Figure 1:
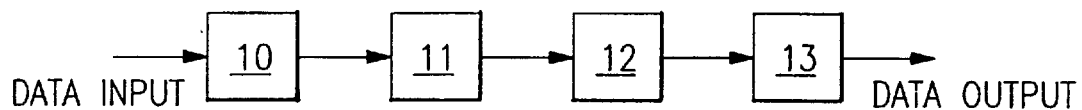
FIG. 1 is an example of instruction pipelining.
Figure 1:
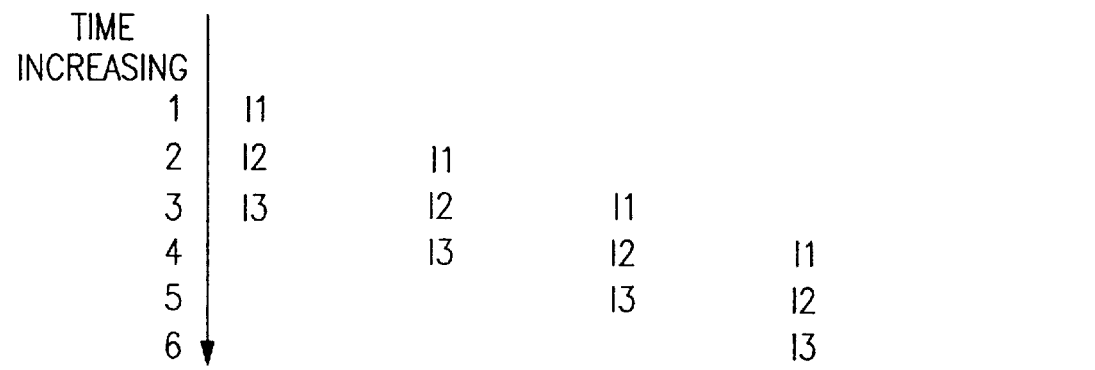

FIG. 1 illustrates the pipelining of execution of instructions. It illustrates the flow of three instructions, I1, I2, and I3 through different stages 10–13 of a pipeline.

At each stage, a machine cycle is assumed to be complete, so increasing time is shown proceeding down the graph. In this example I1, I2, and I3 are assumed to be instructions which have no dependencies upon each other and are introduced into the pipeline sequentially.

Figure 2:
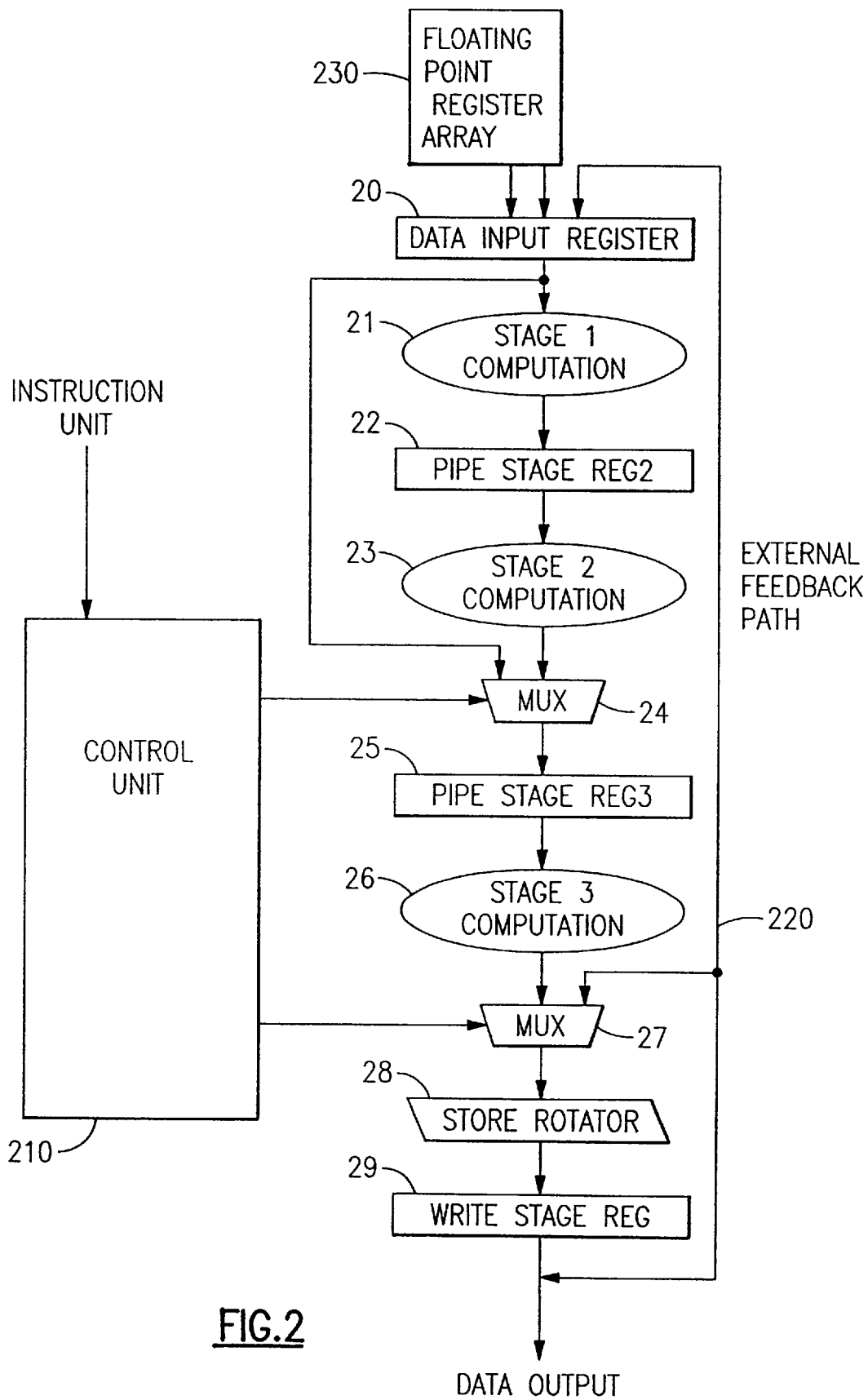
FIG. 2 shows schematically an overview of the preferred embodiment's floating point unit dataflow.

Now turning to FIG. 2, illustrating the floating point units dataflow pipeline, instructions are received into the control unit 210. Instruction data is received into the data input register 20 and data is outputted from the write stage register 29.

The control unit 210 maintains information about the instructions that exist in each of the pipeline stages and uses that information to form control signals to the dataflow pipeline. The control unit 210 provides control to the various control points within the dataflow pipeline. These control points control the progression of instructions through the pipeline.

Figure 3:
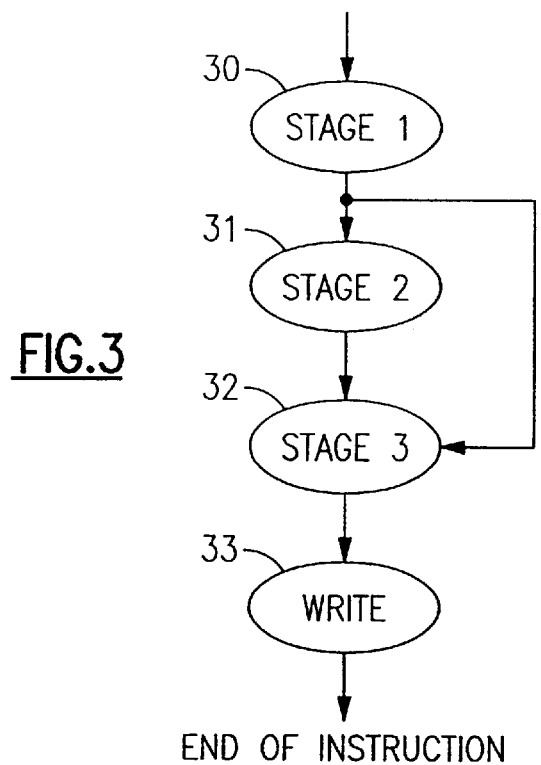
FIG. 3 shows schematically the preferred embodiment's floating point unit control flow.

FIG. 3 shows schematically the control state diagram of the pipeline. There are four control stages of the pipeline 30, 31, 32, 33. Each control stage contains the control information for the multiple instruction which may coexist within the floating point pipeline. A control stage may advance to the next sequential control stage when the conditions are favorable. As mentioned earlier, a control stage will "stall" or not advance when the next sequential stage is busy. It is possible that control stage 1 30 may stall if the data for the instruction is not available. However, in the case of a store instruction with an immediate data dependency, the advancement of control state is possible. This will be described subsequently.

Referring back to FIG. 2, the instruction data is held in the four staging registers of the pipeline 20, 22, 25, 29. These staging registers are held constant during a single execution cycle. If the instruction cannot progress to the next pipeline stage then the staging register is held constant for another execution cycle. At the end of an execution cycle the staging register either accept a new instruction data or hold the previous value.

Between the pipeline staging registers 20, 22, 25, 29 there are computation stages 21, 23, 26 which perform computation on the instruction data in the staging registers 20, 22, 25. The computation performed may be multiplication, addition, normalization, and rounding.

There are two multiplexors 24, 27 present in the pipeline. These multiplexors 24, 27 provide the ability to select from two data inputs under the control of the control unit 210.

The store rotator 28 is a right byte rotator which is used to align the instruction data to the storage boundary.

An external feedback path 220 is provided to quickly resolve data dependencies that cannot be resolved internal to the floating point pipeline dataflow.

Figure 4:
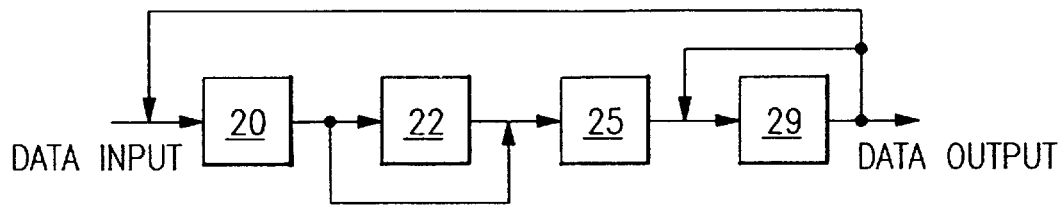
FIG. 4 shows the pipelining diagram of the preferred embodiment's floating point unit dataflow for three instructions with no data dependency.
Figure 4:
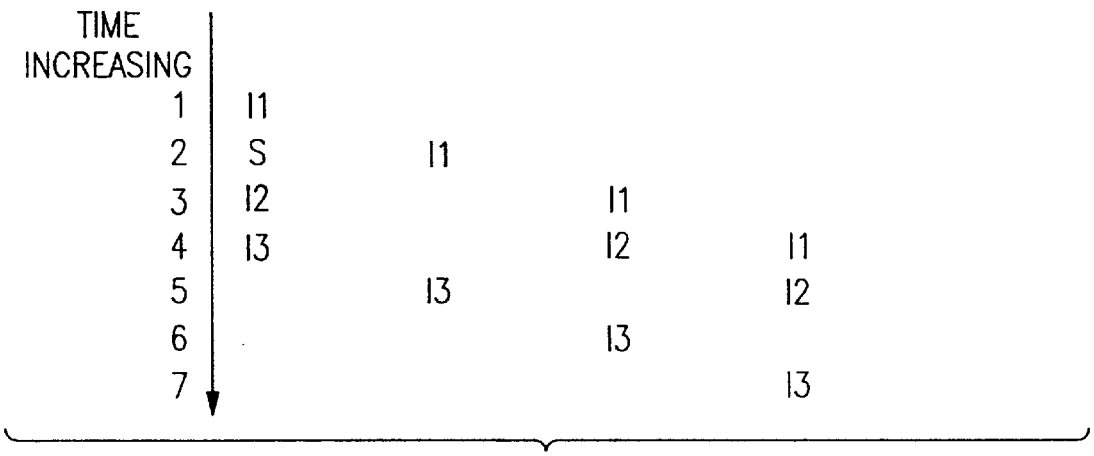

The processing of floating point stores can be described for the three cases. The first case is when the store is not data dependent on a previous instruction in the pipeline. As the store instruction enters the pipeline the contents of the source of the store instruction is read out of the floating point register array 230 and placed into the data input register 20. The store instruction is moved forward through multiplexor 24 into the third stage of the pipeline when there aren't any instructions moving into the pipeline stage reg2 register 22 or the pipeline stage reg3 register 25 besides itself. The store instruction is then fed through the store rotator 28 and into the write stage reg 29 of the pipeline once it becomes available. Once the store instruction is in the write stage reg 29 of the pipeline, it is transferred to the storage unit. A cycle diagram illustrating a store instruction with no data dependency is illustrated in the FIG. 4. In this illustration, I1, I2, and I3 are independent sequential instructions. I2 is a store instruction.

Figure 5:
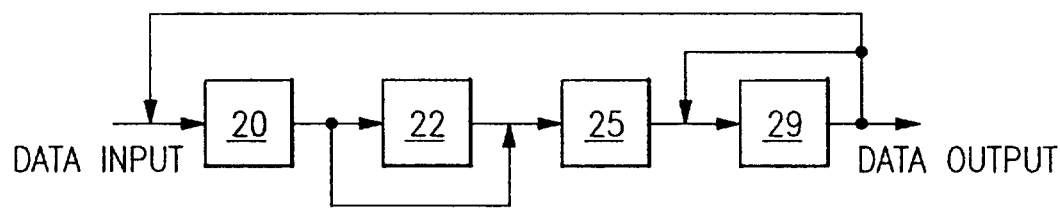
FIG. 5 shows the pipelining diagram of the preferred embodiment's floating point unit dataflow for three instructions with an delayed type of data dependency.
Figure 5:
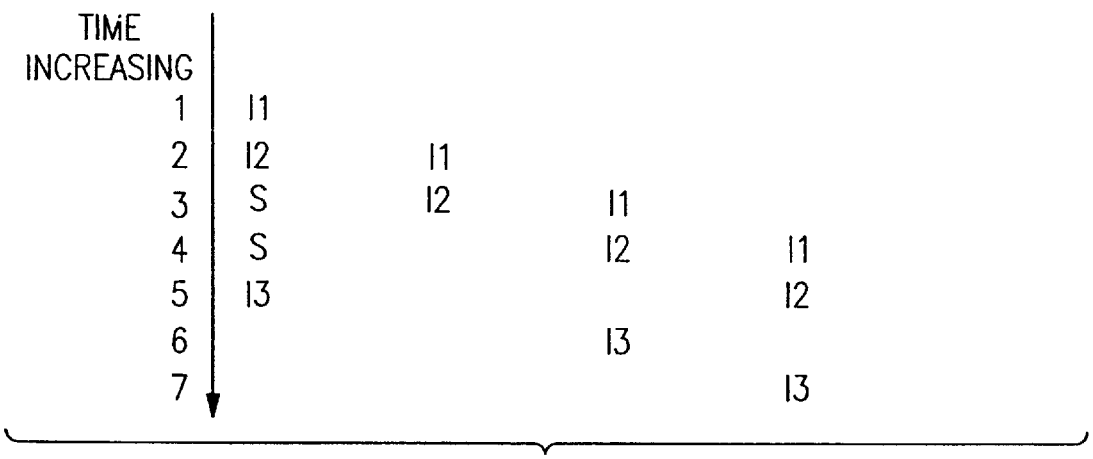

The second case is when the store is data dependent on another instruction in the pipeline but there exists one or more instructions between the store instruction and the interlocking instruction. The steps of execution are described as follows: As the store instruction enters the pipeline the contents of the source of the store is read out of the floating point register array 230 and placed into the data input register 20 even though the data is not the correct data in this case. The control unit 210 detects that there is an interlock with another instruction already in the pipeline. The interlock is described as one which is of the delayed type. Once in the pipeline, the control unit 210 monitors the state of interlock every cycle. The store instruction is held in the data input register 20 of the pipeline until the interlocking instruction reaches the write stage reg register 29 of the pipeline where the result data can be wrapped back into the data input register 20 through the external feedback path 220. Once this occurs, the store instruction proceeds through the multiplexor 24 to the pipeline stage reg3 register 25 of the pipeline. The store instruction is then fed through the store rotator 28 and into the write stage reg register 29 of the pipeline once it becomes available. Once the store instruction is in the write stage reg register 29 of the pipeline, it is transferred to the storage unit. A cycle diagram illustrating a store instruction with an delayed data dependency is illustrated in the FIG. 5. In this illustration I3 is the store instruction which is data dependent on the results of instruction I1. I2 is an intervening instruction in the pipeline.

Figure 6:
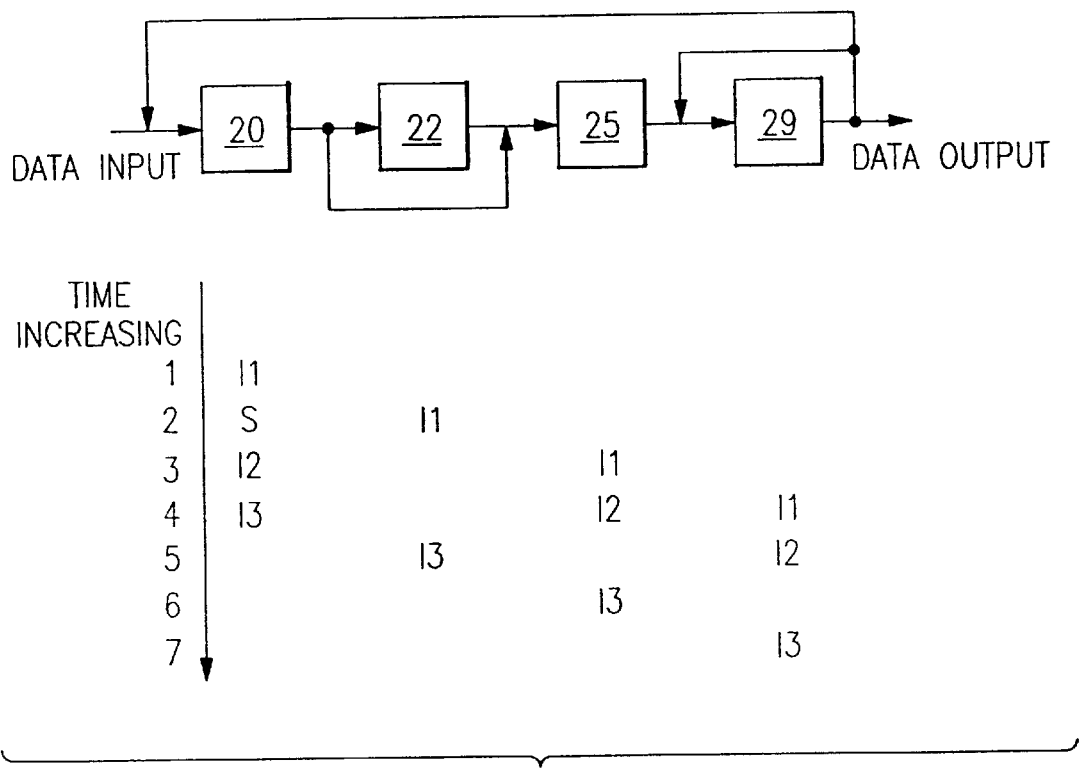
FIG. 6 shows the pipelining diagram of the preferred embodiment's floating point unit dataflow for three instructions with an immediate type of data dependency.

The third and most interesting case is when the store instruction is interlocked with another instruction in the pipeline and there are no instructions between the two. As the store instruction enters the pipeline the contents of the source of the store is read out of the floating point register array 230 and placed into the data input register 20 even though it is not valid in this case. The control unit 210 detects that there is an interlock with another instruction already in the pipeline. The interlock is described as one which is of the immediate type. The store is moved forward into the pipeline stage reg3 register 25 of the pipeline as soon as the immediate interlocking instruction moves into the write stage reg register 29 of the pipeline. Note that the store instruction is moved forward in the pipeline even though its data is not valid yet. When the interlocking instruction is in the write stage reg register 29 and is ready to leave the pipeline its data is selected through multiplexor 27 and through the store rotator 28 and then is latched back into the write stage reg register 29 of the pipeline again. Once the store instruction is in the write stage reg register 29 of the pipeline, it is transferred to the storage unit. A cycle diagram illustrating a store instruction with an immediate data dependency is illustrated in the FIG. 6. In this illustration I2 is the store instruction which is dependent on the results of instruction I1. I3 is an instruction which follows.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A method of latency reduction when processing floating point stores in a floating point unit having a control unit, a data input register and a write stage register from which an instruction is transferred from the floating point unit to a storage unit, said floating point unit having a plurality of pipeline stages for arithmetic computation, a normalization stage, and a rounding stage, each of which pipeline stages may during processing of a stream of instructions contain a separate instruction and wherein the stages are connected in an ordered manner such that the processing of instructions occurs in a pipeline, wherein when an active instruction of the instruction stream enters the pipeline all necessary input data operands are accessed and put into a first stage of the pipeline, whereinafter said active instruction advances from stage to stage within the pipeline as permitted by said instruction stream, and wherein an active instruction is a "stalled" instruction within a pipeline when forward progress is not permitted to advance to a new stage in the pipeline because a successive pipeline stage contains another previous instruction that itself cannot advance because said previous instruction has no data to operate on because an earlier instruction has not updated the data that said another previous instruction at said successive pipeline stage will operate upon whereupon a next active instruction will "stall" at the entrance to the pipeline until the pipeline receives the updated data, characterized by, in the case of a data dependent floating point store instruction, the steps of:

providing intermediate result data from a previous instruction, and providing a forwarding path for the said data dependent floating point store instruction to skip stages in the floating point pipeline, and allowing said data dependent floating point store instruction to progress in the pipeline even though its data is dependent on a previous instruction whose execution has not yet completed; and wherein when a floating point store instruction enters the pipeline, a check is done to determine if the source operand register of the store is dependent upon the results of a previous instruction that has not yet completed and is in the pipeline and there are no intervening instructions between the floating point store instruction and the instruction that it is dependent upon; and wherein said control unit maintains information about the instructions that exist in each of the floating point pipeline stages and uses that information to form control signals to the dataflow floating point pipeline, said control unit providing control to various control points within the dataflow floating point pipeline for control of the progression of instructions through four control stages of the floating point pipeline, each control stage containing control information for a multiple instruction which may coexist within the floating point pipeline, and in the case of a store instruction with an immediate data dependency, wherein an advancement of control state in the progression of instructions through the stages allows a data dependent floating point store instruction to progress in the pipeline even though its data is dependent on a previous instruction whose execution has not yet completed by providing a late wrap path to resolve data dependent stores at the end of the pipeline, and aligning data to be stored with a data alignment circuit just before the pipeline output register, said late wrap path being controlled by an interlock resolution circuit in which interlock resolution detection occurs as the store instruction enters the pipeline, said interlock resolution circuit also providing for interlock detection for non-store instructions wherein the detection information is used to wrap results from a previous instruction in the last stage of the pipeline back through the data alignment circuit and back into the result register, and wherein instruction data is held in four control stage staging registers that are held constant during a single execution cycle, and if an instruction cannot progress to the next pipeline stage then a staging register for that pipeline stage is held constant for another execution cycle until at the end of an execution cycle said staging register either accepts a new instruction data or holds the previous value.

2. A method of latency reduction when processing floating point stores in a floating point unit having a control unit, a data input register and a write stage register from which an instruction is transferred from the floating point unit to a storage unit, said floating point unit having a plurality of pipeline stages for arithmetic computation, a normalization stage, and a rounding stage, each of which pipeline stages may during processing of a stream of instructions contain a separate instruction and wherein the stages are connected in an ordered manner such that the processing of instructions occurs in a pipeline, wherein when an active instruction of the instruction stream enters the pipeline all necessary input data operands are accessed and put into a first stage of the pipeline, whereinafter said active instruction advances from stage to stage within the pipeline as permitted by said instruction stream, and wherein an active instruction is a "stalled" instruction within a pipeline when forward progress is not permitted to advance to a new stage in the pipeline because a successive pipeline stage contains another previous instruction that itself cannot advance because said previous instruction has no data to operate on because an earlier instruction has not updated the data that said another previous instruction at said successive pipeline stage will operate upon whereupon a next active instruction will "stall" at the entrance to the pipeline until the pipeline receives the updated data, characterized by, in the case of a data dependent floating point store instruction, the steps of:

provided intermediate result data from a previous instruction, and providing a forwarding path for the said data dependent floating point store instruction to skip stages in the floating point pipeline, and allowing said data dependent floating point store instruction to progress in the pipeline even though its data is dependent on a previous instruction whose execution has not yet completed; and wherein when a floating point store instruction enters the pipeline, a check is done to determine if the source operand register of the store is dependent upon the results of a previous instruction that has not yet completed and is in the pipeline and there are no intervening instructions between the floating point store instruction and the instruction that it is dependent upon; and wherein in the case when said data dependent floating point store instruction is data dependent on an instruction in the pipeline but there exists one or more instructions between said store instruction and an interlocking instruction, as the store instruction enters the pipeline the contents of the source of the store is read out of a floating point register array and placed into said data input register even though the data is not the correct data in this case, and when the control unit detects that there is an interlock with another instruction already in the pipeline of the delayed type, the control unit monitors the state of interlock every cycle and said store instruction is held in the data input register of the pipeline until the interlocking instruction reaches the write stage register of the pipeline where the result data is wrapped back into the data input register through an external feedback path, whereupon said store instruction proceeds through a multiplexor circuit to the pipeline write stage register of the pipeline and the store instruction is then fed through a data alignment circuit and into the write stage register of the pipeline once it becomes available; whereupon once said data dependent store instruction is in the write stage register of the pipeline it is transferred out to said storage unit.

3. A floating point unit having a control unit, a data input register and a write stage register from which an instruction is transferred from the floating point unit to a storage unit, said floating point unit having a plurality of pipeline stages for arithmetic computation, a normalization stage, and a rounding stage, each of which pipeline stages may during processing of a stream of instructions contain a separate instruction and wherein the stages are connected in an ordered manner such that the processing of instructions occurs in a pipeline, wherein when an active instruction of the instruction stream enters the pipeline all necessary input data operands are accessed and put into a first stage of the pipeline, whereinafter said active instruction advances from stage to stage within the pipeline as permitted by said instruction stream, and wherein an active instruction is a "stalled" instruction within a pipeline when forward progress is not permitted to advance to a new stage in the pipeline because a successive pipeline stage contains another previous instruction that itself cannot advance because said previous instruction has no data to operate on because an earlier instruction has not updated the data that said another previous instruction at said successive pipeline stage will operate upon whereupon a next active instruction will "stall" at the entrance to the pipeline until the pipeline receives the updated data, characterized by, in the case of a data dependent floating point store instruction, the steps of:

providing intermediate result data from a previous instruction, and providing a forwarding path for the said data dependent floating point store instruction to skip stages in the floating point pipeline, and allowing said data dependent floating point store instruction to progress in the pipeline even though its data is dependent on a previous instruction whose execution has not yet completed; and wherein when a floating point store instruction enters the pipeline, a check is done to determine if the source operand register of the store is dependent upon the results of a previous instruction that has not yet completed and is in the pipeline and there are no intervening instructions between the floating point store instruction and the instruction that it is dependent upon; and wherein when said data dependent store instruction is interlocked with another instruction in the pipeline and there are no instructions between the two, as said store instruction enters the pipeline the contents of the source of the store is read out of a floating point register array and placed into said data input register even though it is not valid in this case, and when said control unit detects that there is an interlock with another instruction already in the pipeline of the immediate type the store is moved forward into a pipeline stage register of the pipeline as soon as the immediate interlocking instruction moves forward into said write stage register of the pipeline even though its data is not valid yet, whereupon, when said interlocking instruction is in said write stage register and is ready to leave the pipeline its data is selected through a multiplexor circuit and through the store data alignment circuit and then is latched back into said write stage register of the pipeline again, whereinafter once the store instruction is in the write stage register of the pipeline it is transferred out to said storage unit.

* * * * *